US012742341B2

(12) United States Patent
Mitchell

(10) Patent No.: US 12,742,341 B2
(45) Date of Patent: Sep. 22, 2026

(54) CYLINDER DRY LOCK ASSEMBLY

(71) Applicant: Arconic Technologies LLC, Pittsburgh, PA (US)

(72) Inventor: Michael David Mitchell, Woodstock, GA (US)

(73) Assignee: Arconic Technologies LLC, Pittsburgh, PA (US)

( * ) Notice: Subject to any disclaimer, the term of this patent is extended or adjusted under 35 U.S.C. 154(b) by 0 days.

(21) Appl. No.: 19/071,582

(22) Filed: Mar. 5, 2025

(65) Prior Publication Data

US 2025/0198193 A1 Jun. 19, 2025

Related U.S. Application Data

(63) Continuation of application No. 17/930,127, filed on Sep. 7, 2022, now Pat. No. 12,264,497.

(60) Provisional application No. 63/244,502, filed on Sep. 15, 2021.

(51) Int. Cl.

| | |
|---|---|
| ***E05B 17/00*** | (2006.01) |
| ***E05B 9/08*** | (2006.01) |
| ***E05B 17/04*** | (2006.01) |
| ***E05B 65/00*** | (2006.01) |

(52) U.S. Cl.

CPC ............ *E05B 17/002* (2013.01); *E05B 9/084* (2013.01); *E05B 9/086* (2013.01); *E05B 17/04* (2013.01); *E05B 65/001* (2013.01)

(58) Field of Classification Search

CPC . E05B 9/08; E05B 9/084; E05B 9/086; E05B 17/002; E05B 17/04; E05B 17/041; E05B 17/047; E05B 65/001

See application file for complete search history.

(56) References Cited

U.S. PATENT DOCUMENTS

| | | | | |
|---|---|---|---|---|
| 4,338,806 | A * | 7/1982 | Cox | E05B 63/006 70/417 |
| 4,444,033 | A * | 4/1984 | Deckert | E05B 27/00 70/375 |
| 4,708,007 | A * | 11/1987 | Stoia | E05B 9/08 D8/352 |
| 5,884,512 | A | 3/1999 | Wayne | |
| 6,883,356 | B1 * | 4/2005 | Wu | E05B 17/04 70/379 R |
| 8,127,579 | B2 * | 3/2012 | Mannella | E05B 9/086 70/379 R |
| 8,240,178 | B2 | 8/2012 | Massard et al. | |
| 10,329,802 | B1 * | 6/2019 | Huang | E05B 63/006 |
| 11,988,026 | B2 * | 5/2024 | Lee | E05B 55/005 |
| 12,264,497 | B2 * | 4/2025 | Mitchell | E05B 9/086 |

(Continued)

FOREIGN PATENT DOCUMENTS

WO 2019079897 A1 5/2019

*Primary Examiner* — Christopher J Boswell

(74) *Attorney, Agent, or Firm* — Vorys, Sater, Seymour and Pease LLP

(57) ABSTRACT

A door assembly is disclosed that includes a door and a cylinder dry lock assembly mounted to the door and including a cylinder lock, a thumb-turn lock, and an actuation mechanism interposing the cylinder lock and the thumb-turn lock. The actuation mechanism includes a first adapter matable with the cylinder lock and a second adapter matable with the thumb-turn lock and the first adapter. Actuation of the cylinder lock actuates the thumb-turn lock via the actuation mechanism.

16 Claims, 9 Drawing Sheets

(56) References Cited

U.S. PATENT DOCUMENTS

| | | | | |
|---|---|---|---|---|
| 2014/0216112 | A1* | 8/2014 | Yang | E05B 63/006<br>70/78 |
| 2021/0348418 | A1* | 11/2021 | Lu | E05C 21/00 |
| 2023/0014486 | A1* | 1/2023 | Liang | E05B 17/226 |

* cited by examiner

CYLINDER DRY LOCK ASSEMBLY

BACKGROUND

Commercial doors have been used for years as points of ingress and egress to/from a building. Many doors use exit devices installed in the interior of the door as a means of quickly unlocking or opening a door to facilitate ingress or egress. Many of these exit devices utilize a cylinder lock mounted on the exterior surface of a door to improve security and allow someone on the outside of the building to unlock the exit device and thereby open the door. The unlocking action of the cylinder causes rotation of a cam or a pigtail on the back of the cylinder lock, which transfers the turning motion of the key though the door to retract a latch from its securing location, thus unlocking the exit device and allowing the door to be opened.

To accommodate the cylinder lock, a hole is defined in the stile of the door and extends completely through the stile (i.e., from the exterior to the interior). When the exit device is mounted to the interior side of the door, the hole is hidden (covered) by portions of the exit device, but nonetheless presents a point of water ingress. This is particularly apparent during flood events that occur in low lying areas and that produce flood depths that reach the height of the cylinder lock (e.g., about thirty-six inches or more). As a result of the hydrostatic pressure induced by the flood depth, water will continue to enter the building through the hole until the flood water subsides. Since the influx of this water can be very damaging, it is desirable to stop or reduce water entry through the cylinder lock hole, and thereby mitigate potential losses incurred due to flooding.

Furthermore, to be able to certify that a non-residential building located in special flood hazard areas is "flood proof", the Federal Emergency Management Agency (FEMA) of the United States requires that such buildings meet certain restrictions in accordance with the National Flood Insurance Program—see FEMA Technical Bulletin 93-3. As part of the certification process, a design professional, a registered professional engineer, or an architect must certify that the building is watertight, meaning that "floodwaters must not enter the building envelope," and that the building's walls must be "substantially impermeable to the passage of water." Accordingly, to be able to achieve flood proof certification of non-residential buildings, it is desirable to develop and incorporate systems and assemblies that help prevent the influx of flood waters through doors.

SUMMARY OF THE DISCLOSURE

Embodiments disclosed herein include a door assembly that includes a door having opposing first and second surfaces and a hole defined in the door and extending between the first and second surfaces, a cylinder lock mounted to the second surface at the hole, and a cylinder dry lock assembly mounted to the door at the hole adjacent the first surface. The cylinder dry lock assembly incudes a main body that defines a central orifice, a low-friction member received within the central orifice, and an actuation mechanism extending from the low-friction member and engageable with the cylinder lock, wherein actuating the cylinder lock rotates the actuation mechanism, and wherein the cylinder dry lock assembly generates a sealed interface at the hole that prevents water from migrating between the first and second surfaces at the hole. In a further embodiment of the door assembly, the main body is secured to the door within an interior of the door. In another further embodiment, the door assembly further includes one or more reliefs defined in the main body, and one or more mechanical fasteners extendable through the one or more reliefs and receivable by the cylinder lock to attach the cylinder lock to the main body. In another further embodiment, the door assembly includes a filler material received within the one or more reliefs on top of the one or more mechanical fasteners. In another further embodiment, the door assembly includes a sealant applied to the cylinder dry lock assembly as mounted to the door at the hole, wherein the sealant covers at least one of i) mechanical fasteners that couple the main body to the door, ii) the filler material, or iii) a portion of the low-friction member. In another further embodiment of the door assembly, the low-friction member comprises an annular structure that defines an inner hole, and the actuation mechanism comprises a head receivable within the inner hole and defining a recess, and a tab extension extending from the head, wherein the cylinder lock provides a tab receivable within the recess such that actuating the cylinder lock correspondingly rotates the tab and the actuation mechanism relative to the main body. In another further embodiment, the door assembly includes an exit device mounted to the first surface and including a latch housing and a latch pivotably mounted to a side of the latch housing, wherein the tab extension is receivable within a receiver provided within the latch housing, and wherein actuating the cylinder lock rotates the actuation mechanism and thereby causes the latch to actuate. In another further embodiment of the door assembly, the low-friction member comprises an annular structure that defines an inner hole, and the actuation mechanism extends through the inner hole and comprises a first cam adapter engageable with the cylinder lock, and a second cam adapter operatively coupled to the first cam adapter, wherein actuating the cylinder lock rotates the first and second cam adapters relative to the main body. In another further embodiment, the door assembly includes a thumb-turn lock mounted to the first surface and engageable with the second cam adapter such that actuating the cylinder lock correspondingly actuates the thumb-turn lock via the actuation mechanism. In another further embodiment of the door assembly, the first cam adapter provides a male indexing feature matable with a female indexing feature of the second cam adapter.

Embodiments disclosed herein may further include a cylinder dry lock assembly that includes a main body mountable to a door having opposing first and second surfaces and a hole defined in the door and extending between the first and second surfaces, the main body being mountable within an interior of the door at the hole and defining a central orifice, a low-friction member receivable within the central orifice, and an actuation mechanism extending from the low-friction member and engageable with a cylinder lock mountable to the second surface, wherein actuating the cylinder lock rotates the actuation mechanism, and wherein the cylinder dry lock assembly generates a sealed interface at the hole that prevents water from migrating between the first and second surfaces through the hole. In a further embodiment of the cylinder dry lock assembly, the main body defines a raised shoulder configured to be received at the hole within the interior of the door. In another further embodiment of the cylinder dry lock assembly, the low-friction member is selected from the group consisting of a sealed bearing, a bushing, a bushing assembly, and any combination thereof. In another further embodiment, the cylinder dry lock assembly includes a shelf defined within the central orifice, wherein the low-friction member engages the shelf when received within the central orifice. In another further embodiment of the cylinder dry lock assembly, the low-friction member and the actuation mechanism comprise a monolithic, single component part jointly receivable within the central orifice. In another further embodiment of the cylinder dry lock assembly, the low-friction member comprises an annular structure that defines an inner hole, and the actuation mechanism includes a head receivable within the inner hole and defining a recess, and a tab extension extending from the head, wherein the cylinder lock provides a tab receivable within the recess such that actuating the cylinder lock correspondingly rotates the tab and the actuation mechanism. In another further embodiment of the cylinder dry lock assembly, the tab extension defines one or more breakaway points. In another further embodiment of the cylinder dry lock assembly, the low-friction member comprises an annular structure that defines an inner hole, and the actuation mechanism extends through the inner hole and comprises a first cam adapter engageable with the cylinder lock, and a second cam adapter operatively coupled to the first cam adapter, wherein actuating the cylinder lock rotates the first and second cam adapters relative to the main body. In another further embodiment of the cylinder dry lock assembly, the first cam adapter provides a male indexing feature matable with a female indexing feature of the second cam adapter.

Embodiments disclosed herein may also include a method of assembling a door assembly, the method including the steps of mounting a cylinder dry lock assembly within an interior of a door at a hole defined in the door, the hole extending between opposing first and second surfaces of the door, and the cylinder dry lock assembly including a main body that defines a central orifice, a low-friction member receivable within the central orifice, and an actuation mechanism extending from the low-friction member. The method further including the steps of mounting a cylinder lock to the second surface of the door at the hole and thereby engaging the actuation mechanism, wherein actuating the cylinder lock rotates the actuation mechanism, and wherein the cylinder dry lock assembly generates a sealed interface at the hole that prevents water from migrating between the first and second surfaces through the hole.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to door assemblies and, more particularly, to a cylinder dry lock assembly that facilitates a sealed interface for cylinder locks on doors and thereby helps keep high water events from penetrating into a building while still allowing the door to be unlocked from the exterior.

Figure 1:
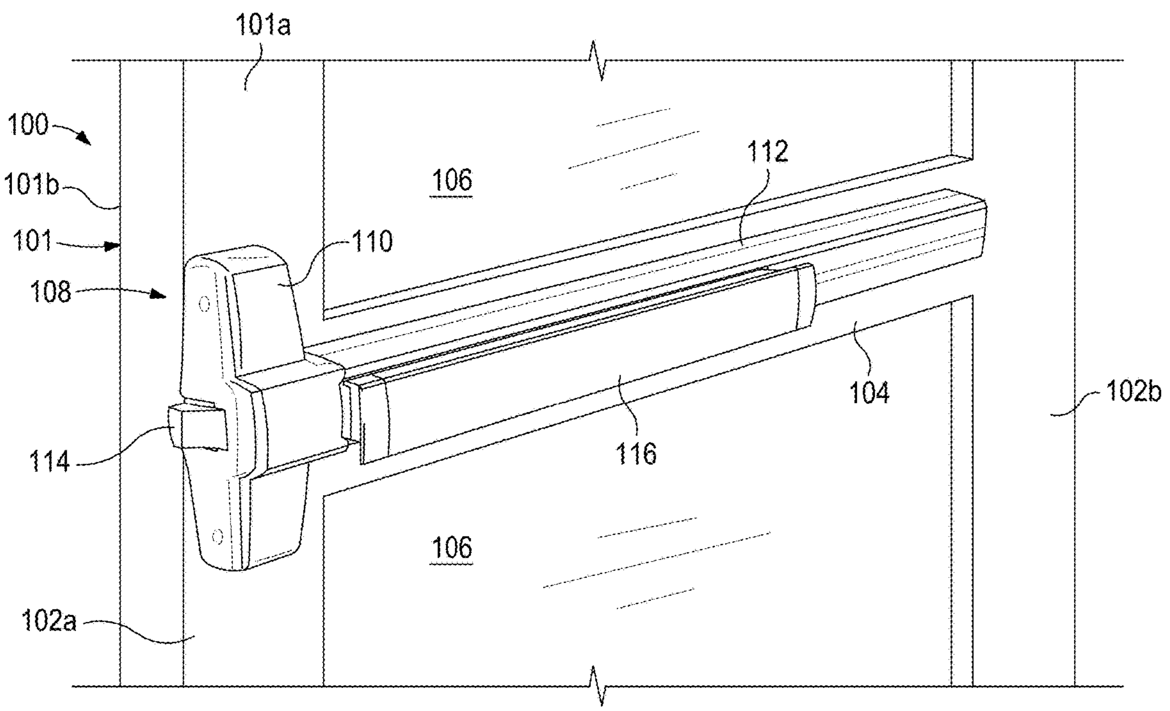
FIG. 1 is an isometric view of an example door that may incorporate the principles of the present disclosure, according to one or more embodiments.

FIG. 1 is an isometric view of an example door assembly 100 that may incorporate the principles of the present disclosure, according to one or more embodiments. As illustrated, the door assembly 100 includes a door 101 that has a first or "interior" surface 101*a* and a second or "exterior" surface 101*b* opposite the interior surface 101*a*. The interior surface 101*a* is generally configured to be exposed to the interior of a building, and the exterior surface 101*b* is generally configured to be exposed to the environment outside of (external to) the building.

In the illustrated embodiment, the door 101 may include a first or "left" stile 102*a*, a second or "right" stile 102*b*, and a rail 104 that extends laterally between the stiles 102*a,b*. When the door assembly 100 is installed in a door frame, the stiles 102*a,b* run substantially vertical, and the rail 104 extends substantially horizontal relative to the stiles 102*a,b*.

In some embodiments, the door assembly 100 may further include one or more glazings or infills 106. In the illustrated embodiment, the door assembly 100 includes two infills 106 (upper and lower) separated by the rail 104. The infills 106 may comprise, for example, panes of window glass, polycarbonates, or other clear, translucent, tinted, or opaque panels. In other embodiments, however, the infills 106 may be omitted and the stiles 102*a,b* and the rail 104 may simply form part of the interior and exterior surfaces 101*a,b* of the door 101. In such embodiments, for example, the door 101 may comprise a hollow metal door or a solid wood door with no infills 106.

The door assembly 100 further includes an exit device 108 operable to open the door 101. The type of exit device 108 shown in FIG. 1 is alternately referred to as a panic exit device, panic or exit hardware, or a panic or exit bolt and crash bar. The principles of the present disclosure, however, are equally applicable to other types of exit devices that incorporate cylinder locks and the like. For example, the principles described herein are equally applicable to locks and latches that may be installed on the first stile 102*a* and may operate in conjunction with a cylinder lock, or could alternatively be applicable to thumb-turn mounted locks located on the interior of a door, as described in more detail below. For purposes of the discussion in this section, however, the exit device 108 will be described herein with reference to the inventive concepts. Moreover, while the exit device 108 is depicted herein in conjunction with a pivot-type door, the principles described herein are equally applicable to sliding or "slider" doors.

In the illustrated embodiment, the exit device 108 includes a latch housing 110 and a push bar housing 112 extending laterally from the latch housing 110. The exit device 108 is typically mounted to the interior surface 101*a* (side) of the door 101. As illustrated, the latch housing 110 is generally mounted to the first stile 102*a*, also referred to as the "lock stile," and the push bar housing 112 extends laterally from the latch housing 110 toward the second stile 102*b*, also referred to as the "pivot stile." In embodiments that include the infills 106, the push bar housing 112 may be mounted to the rail 104 that separates the infills 106. In embodiments that omit the infills 106, however, the latch housing 110 and the push bar housing 112 may alternatively be mounted to the general interior surface 101*a* of the door 101.

The latch housing 110 and the push bar housing 112 each accommodate various mechanical devices and gearing (not shown) that are actuatable to operate (e.g., retract or extend) a latch 114 pivotably mounted to a lateral side of the latch housing 110. When extended, the latch 114 can be received into a latch receptor (not shown) provided in a doorframe and thereby help maintain the door 101 in a closed position. A release bar 116 (alternately referred to as a "push pad") is movably mounted to the push bar housing 112. When depressed, the release bar 116 interacts with the internal mechanical devices and gearing housed within the push bar housing 112 and causes corresponding internal mechanical devices and gearing housed within the latch housing 110 to actuate. This causes the latch 114 to pivot away from the latch receptor and retract into the latch housing 110, thus permitting the door 101 to be opened. The principles of the present disclosure, however, are not limited to exit devices that include the latch housing 110, the push bar housing 112, the latch 114, and the release bar 116. Rather, the concepts disclosed herein are equally applicable to concealed vertical rod exit devices, which include latches in the form of one or more rods that extend into the door header to secure the door in the closed position.

Since the exit device 108 is mounted to the interior surface 101*a* of the door 101, this allows for quick exit from a building in the event of an emergency or otherwise. The release bar 116 is spring loaded such that releasing pressure on the release bar 116 allows the release bar 116 to spring back to its natural position, which causes the latch 114 (also spring loaded) to extend from the latch housing 110 once again. In typical operation, the exit device 108 is activated from the interior surface 101*a* of the door 101.

A key-operated cylinder lock (not shown) is typically mounted to the exterior surface 101*b* of the door 101 and extends to the internal mechanical devices and gearing housed within the latch housing 110. The cylinder lock allows a user on the exterior of the door 101 to use a key to actuate the cylinder lock and thereby release the latch 114 and unlock the door 101. More particularly, a hole (not shown) is defined in the first stile 102*a* to receive and accommodate the cylinder lock, and the hole extends completely through the first stile 102*a* to allow portions of the cylinder lock to reach and mechanically mate with the internal mechanical devices and gearing housed within the latch housing 110. When the exit device 108 is mounted to the interior surface 101*a* of the door 101, the hole is covered (hidden) by the latch housing 110, but during flooding events that reach the height of the exit device 108, water can enter the building through the hole that accommodates the cylinder lock.

According to embodiments of the present disclosure, a cylinder dry lock assembly (not shown) can be used to provide an interface between the cylinder lock mounted on the exterior surface 101*b* of the door 101 and the exit device 108 mounted on the interior surface 101*a* of the door 101. The cylinder dry lock creates an interface between the cylinder lock and the exit device 108 that greatly reduces the amount of water that might flow freely through the interface in the event of a flood. Moreover, the cylinder dry lock described herein may also help facilitate an airtight door assembly. Additionally, during non-flood conditions, the cylinder dry lock allows normal locking and unlocking of the door 101.

Figure 2:
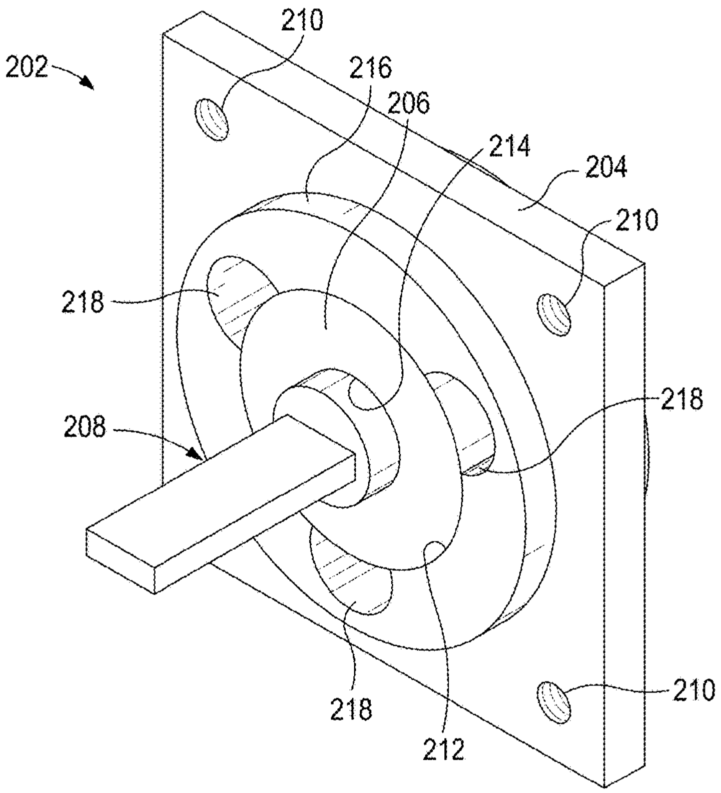
FIG. 2 is an isometric view of an example cylinder dry lock assembly, according to one or more embodiments.

FIG. 2 is an isometric view of an example cylinder dry lock assembly 202, according to one or more embodiments of the disclosure. As illustrated, the cylinder dry lock assembly 202 includes a main body 204, a low-friction member 206, and an actuation mechanism 208 configured to be actuated through use of a cylinder lock. In the illustrated embodiment, the main body 204 exhibits a generally square shape, but could alternatively exhibit other shapes without departing from the scope of the disclosure. The main body 204 defines one or more apertures 210 configured to receive a corresponding one or more mechanical fasteners (not shown) used to secure the main body 204 to the first stile 102*a* (FIG. 1). The main body 204 further defines a central orifice 212 sized to receive the low-friction member 206 and the actuation mechanism 208.

As described in more detail below, the central orifice 212 at the diameter shown in FIG. 2 may not extend entirely through the main body 204. Rather, in some embodiments, a shelf with a reduced-diameter may be provided within the central orifice and may be arranged to receive the low-friction member 206 and the actuation mechanism 208.

In some embodiments, the low-friction member 206 and the actuation mechanism 208 may comprise a monolithic, single component part sized to be jointly received within the central orifice 212. In such embodiments, the low-friction member 206 and the actuation mechanism 208 may be 3D printed of the same material, for example. Moreover, in such embodiments, the low-friction member 206 and the actuation mechanism 208 may be configured to cooperatively rotate within the central orifice 212 during operation.

In other embodiments, however, the low-friction member 206 and the actuation mechanism 208 may comprise separate component parts. In such embodiments, the low-friction member 206 may comprise an annular structure that defines an inner hole 214 sized to receive or mate with a portion of the actuation mechanism 208. In at least one embodiment, for example, the actuation mechanism 208 may be coupled to the low-friction member 206 via an interference fit or the like, but may otherwise be mated via any other fixed means, without departing from the scope of the disclosure. When the actuation mechanism 208 is properly mated with the low friction-member 206, rotating the actuation mechanism 208 will correspondingly rotate at least a portion of the low-friction member 206 relative to the main body 204. In such embodiments, the low-friction member 206 may comprise a sealed bearing, a bushing, a bushing assembly, or any combination thereof.

In some embodiments, the main body 204 may also provide or otherwise define a raised shoulder 216 that circumscribes the central orifice 212. The raised shoulder 216 may be shaped and otherwise configured to be received within a hole defined in the first stile 102*a*, and thereby properly locate the cylinder dry lock assembly 202 on the first stile 102*a*.

The main body 204 may further provide or otherwise define a plurality of reliefs 218. In the illustrated embodiment, three reliefs 218 are shown, but more or less than three may be included, without departing from the scope of the disclosure. As illustrated, the reliefs 218 are defined in the main body 204 by extending radially outward from the inner circumference of the central orifice 212. Moreover, the reliefs 218 may be equidistantly spaced about the inner circumference of the central orifice 212, as illustrated, but could alternatively be spaced non-equidistantly.

At least one of the reliefs 218 may provide a means for introducing a mechanical fastener (not shown) used to attach a cylinder lock (not shown) to the main body 204, and thereby attach the cylinder lock to the first stile 102*a* when the cylinder dry lock assembly 202 is properly installed in the first stile 102*a*. In some embodiments, at least one of the reliefs 218 may be used as an access point where a bearing puller (or the like) may be introduced to remove the low-friction member 206 and the actuation mechanism 208 if replacement or maintenance is required.

Figure 3:
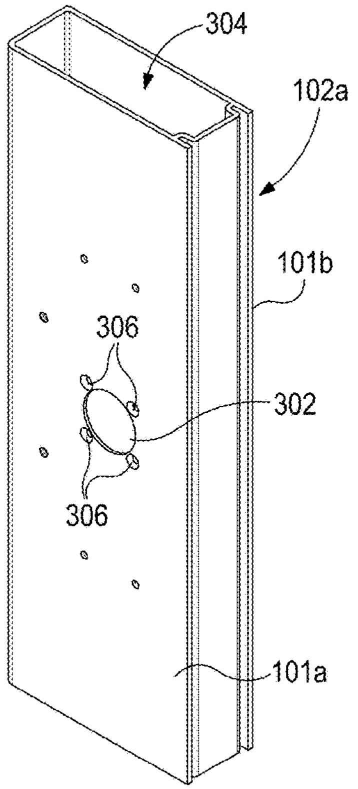
FIG. 3 is an isometric view of the first stile of FIG. 1.

FIG. 3 is an isometric view of the first stile 102*a*. As illustrated, the first stile 102*a* may define a hole 302 that extends through the door 101 (FIG. 1), between the interior and exterior surfaces 101*a,b*. At the interior surface 101*a*, the hole 302 may be configured to receive the cylinder dry lock assembly 202 (FIG. 2). More specifically, the hole 302 may be sized and otherwise configured to receive the raised shoulder 216 (FIG. 2) of the main body 204 (FIG. 2). To install the cylinder dry lock assembly 202 at the hole 302, the main body 204 may be introduced into the interior 304 of the first stile 102*a* and advanced into the interior until the raised shoulder 216 locates and mates with the hole 302. The first stile 102*a* may further define a plurality of apertures 306 configured to coaxially align with the apertures 210 (FIG. 2) of the main body 204. Consequently, and as discussed in more detail below, once the cylinder dry lock assembly 202 is properly received at the hole 302, mechanical fasteners may be introduced through the coaxially aligned apertures 210, 306 to secure the cylinder dry lock assembly 202 to the first stile 102*a*.

Figure 4A:
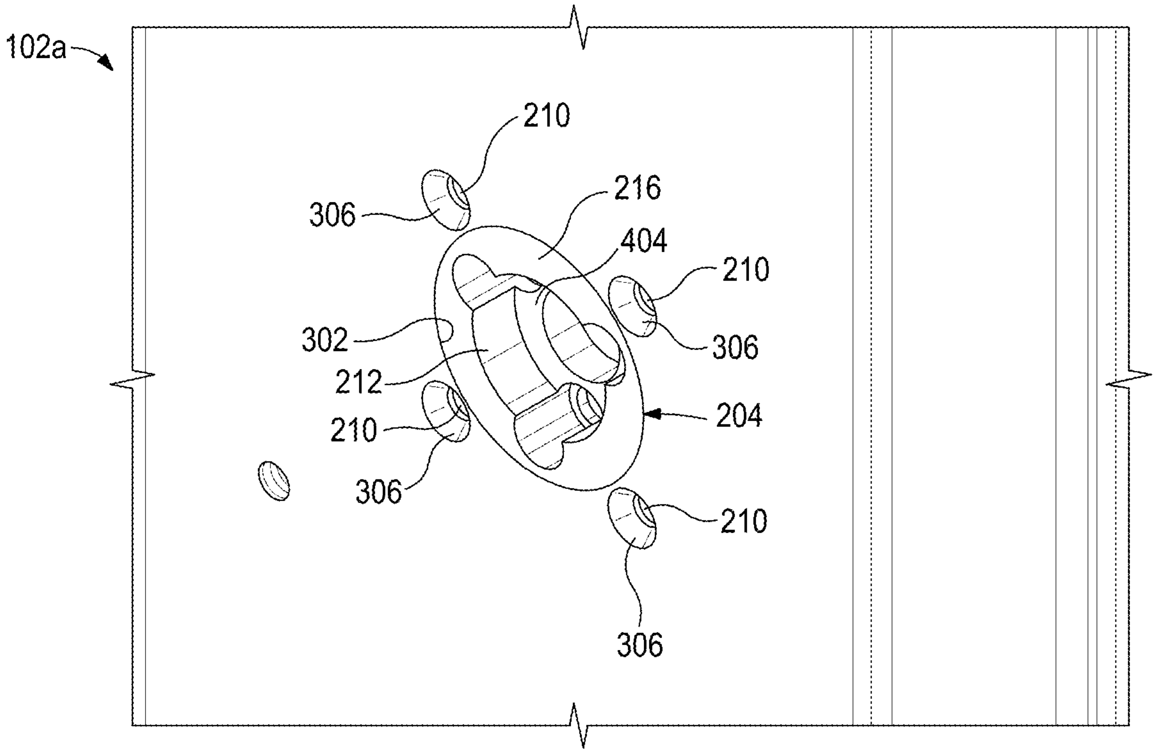
FIGS. 4A and 4B are enlarged isometric views of a portion of the first stile of FIG. 1.
Figure 4B:
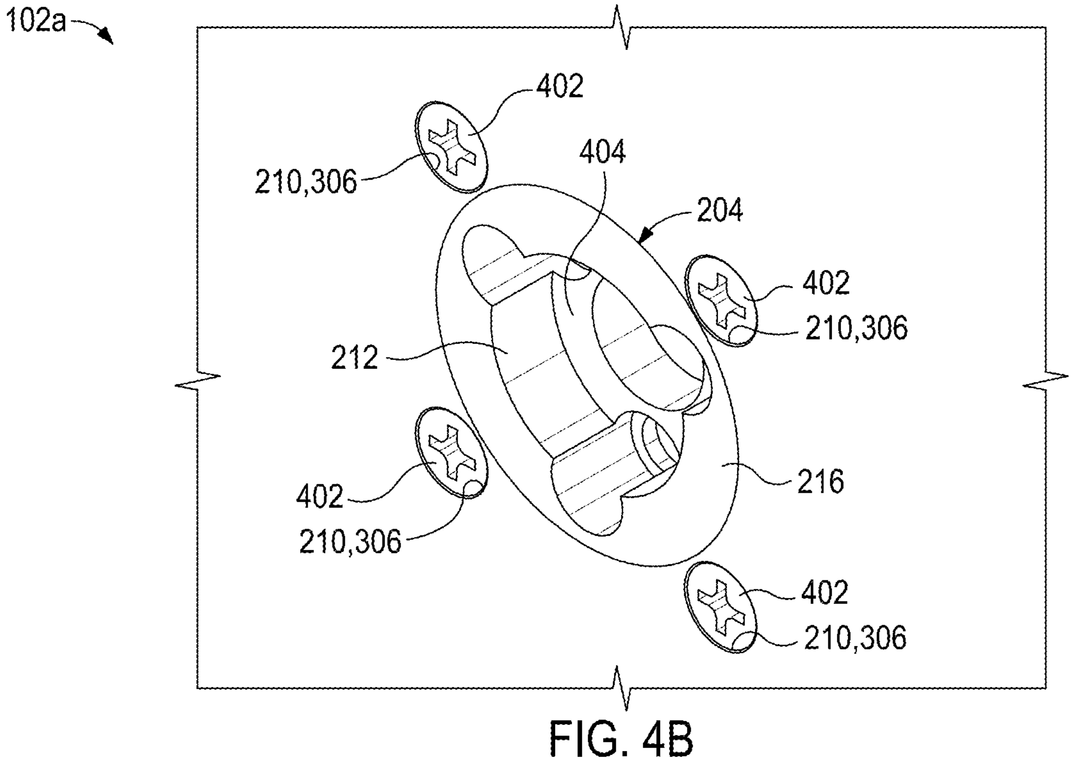

FIGS. 4A and 4B are enlarged isometric views of a portion of the first stile 102*a*. In FIG. 4A, the raised shoulder 216 of the main body 204 is received within the hole 302 and the apertures 210 defined in the main body 204 are aligned with the apertures 306 of the first stile 102*a*. In FIG. 4B, the main body 204 is secured to the first stile 102*a* using one or more mechanical fasteners 402 received within the coaxially aligned apertures 210, 306.

In some embodiments, as also shown in FIGS. 4A-4B, a shoulder or "shelf" 404 may be defined or otherwise provided within the central orifice 212. The shelf 404 may be recessed into the central orifice 212 and away from the raised shoulder 216 near a bottom of the central orifice 212. The shelf 404 may be sized to receive an end of the low-friction member 206 (FIG. 2). Accordingly, when the low-friction member 206 is received and advanced within the central orifice 212, an end of the low-friction member 206 may come into close contact with or otherwise contact the shelf 404.

Figure 5A:
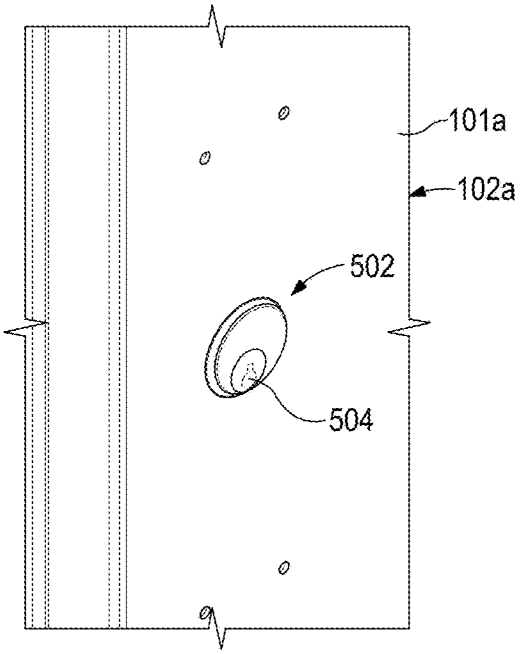
FIGS. 5A-5C depict installation of an example cylinder lock, according to one or more embodiments.
Figure 5B:
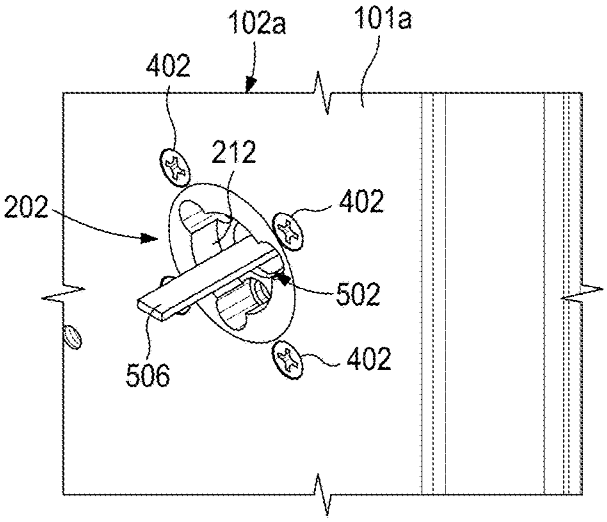
Figure 5C:
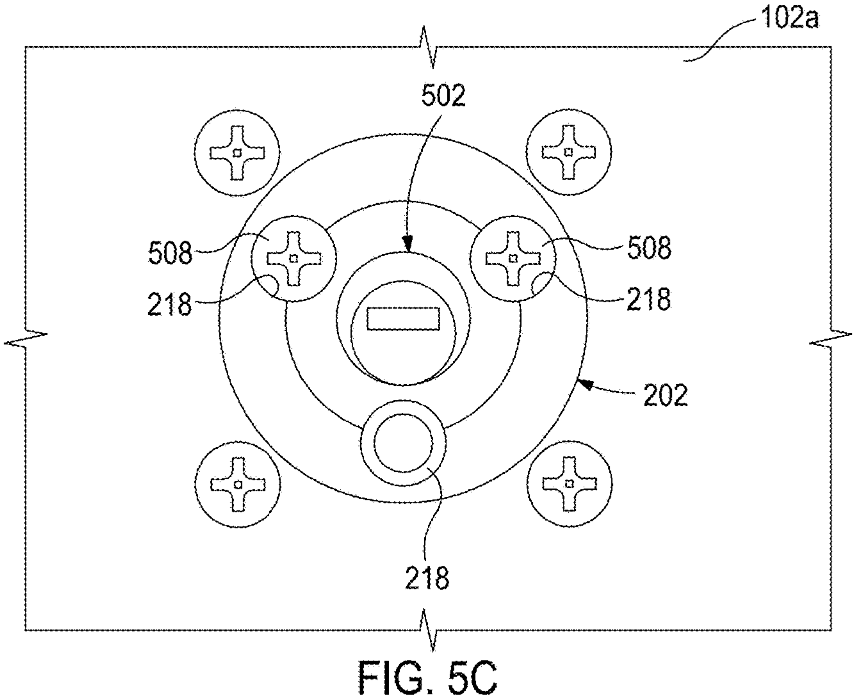

FIGS. 5A-5C depict installation of an example cylinder lock 502, according to one or more embodiments. In the illustrated embodiment, the cylinder lock 502 comprises a tab-activated cylinder lock that is actuated by rotating a tab. As discussed in more detail below, however, the cylinder dry lock assembly 202 can equally be used with cam-actuated cylinder locks, without departing from the scope of the disclosure.

In FIG. 5A, the cylinder lock 502 is shown installed on and otherwise mounted to the exterior surface 101*b* of the first stile 102*a*. As illustrated, the cylinder lock 502 provides a key hole 504 configured to receive a key (not shown), and rotating the key while inserted into the key hole 504 actuates the cylinder lock 502, which causes the door 101 (FIG. 1) to lock or unlock, depending on the direction of rotation.

FIG. 5B is an isometric view of the interior surface 101*a* of the first stile 102*a* with the cylinder dry lock assembly 202 installed thereon using the mechanical fasteners 402. When the cylinder lock 502 is installed on the first stile 102*a*, a portion of the cylinder lock 502 may extend through the cylinder dry lock assembly 202. More specifically, the cylinder lock 502 provides a tab 506 (alternately referred to as a "pigtail") that extends at least partially through the central orifice 212.

FIG. 5C is a front view of the interior surface 101*a* of the first stile 102*a*, and also depicts one or more mechanical fasteners 508 used to secure the cylinder lock 502 to the cylinder dry lock assembly 202. In the illustrated embodiment, two mechanical fasteners 508 are received within a corresponding two of the reliefs 218 defined in the main body 204. The mechanical fasteners 508 extend through the corresponding reliefs 218 and are received by corresponding apertures (not shown) defined by the cylinder lock 502. Tightening the mechanical fasteners 508 secures the cylinder lock 502 to the cylinder dry lock assembly 202, and thereby correspondingly secures the cylinder lock 502 to the first stile 102*a*.

Figure 6A:
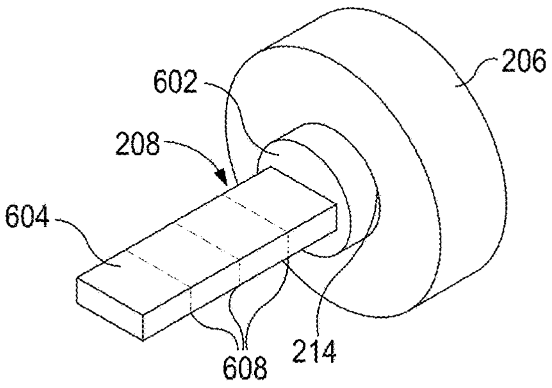
FIGS. 6A and 6B are isometric front and back views of the low-friction member and the actuation mechanism.
Figure 6B:
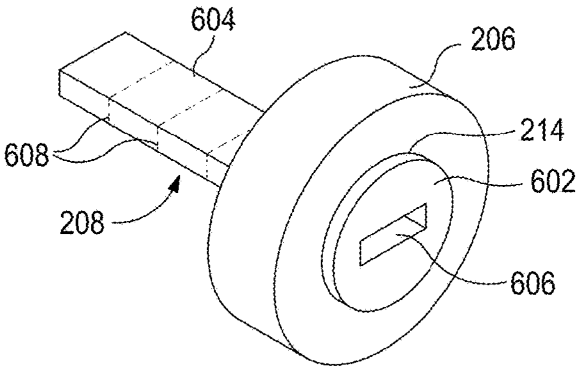

FIGS. 6A and 6B are isometric front and back views of the low-friction member 206 and the actuation mechanism 208. As discussed above, in some embodiments, the low-friction member 206 and the actuation mechanism 208 may comprise separate component parts. In such embodiments, the low-friction member 206 can be an annular structure that defines the inner hole 214, and the actuation mechanism 208 may be coupled to the low-friction member 206 at the inner hole 214. In other embodiments, however, as also discussed above, the low-friction member 206 and the actuation mechanism 208 may comprise a monolithic component part manufactured as a single element (e.g., via 3D printing).

In the illustrated embodiment, which is compatible with tab-activated cylinder locks, the actuation mechanism 208 includes a head 602 and a tab extension 604 that extends from the head 602. In embodiments where the low-friction member 206 and the actuation mechanism 208 are separate component parts, the head 602 may be sized to be received within the inner hole 214. Otherwise, the head 602 may form part of the low-friction member 206 and the tab extension 604 may extend therefrom.

As best seen in FIG. 6B, a recess 606 may be defined in the head 602 and may be sized to receive an end of the tab 506 (FIG. 5B) of the cylinder lock 502 (FIGS. 5A-5C). The recess 606 may comprise a pocket with a bottom, thus not extending through the tab extension 604. In some embodiments, it may be necessary to reduce the length of the tab 506 so that it can be properly received within the recess 606 as assembled. Accordingly, the tab 506 will typically not extend through the first stile 102*a*; e.g., from the exterior surface 101*b* (FIG. 1) of the door 101 (FIG. 1) and past the interior surface 101*a* (FIG. 1). Rather, to be able to properly mate with the recess 606, which will be located within the interior of the first stile 102*a*, the length of the tab 506 need only extend sufficiently to be received by the recess 606.

The tab extension 604 may comprise a generally planar structure that effectively serves as an axial extension to the tab 506 when the tab 506 is received within the recess 606. Once the tab 506 is properly received within the recess 606, operating (actuating) the cylinder lock 502 (e.g., through the use of a key) will rotate the tab 506 and correspondingly cause the tab extension 604 to rotate in the same angular direction.

In some applications, the length of the tab extension 604 may need to be reduced to allow the actuation mechanism 208 to properly fit in doors of various widths. Accordingly, in some embodiments, the tab extension 604 may provide or define one or more breakaway points 608 that allow a user to manually break off sections of the tab extension 604 and thereby reduce its length. The breakaway points 608 may comprise, for example, perforated or weakened portions of the tab extension 604.

Figure 7A:
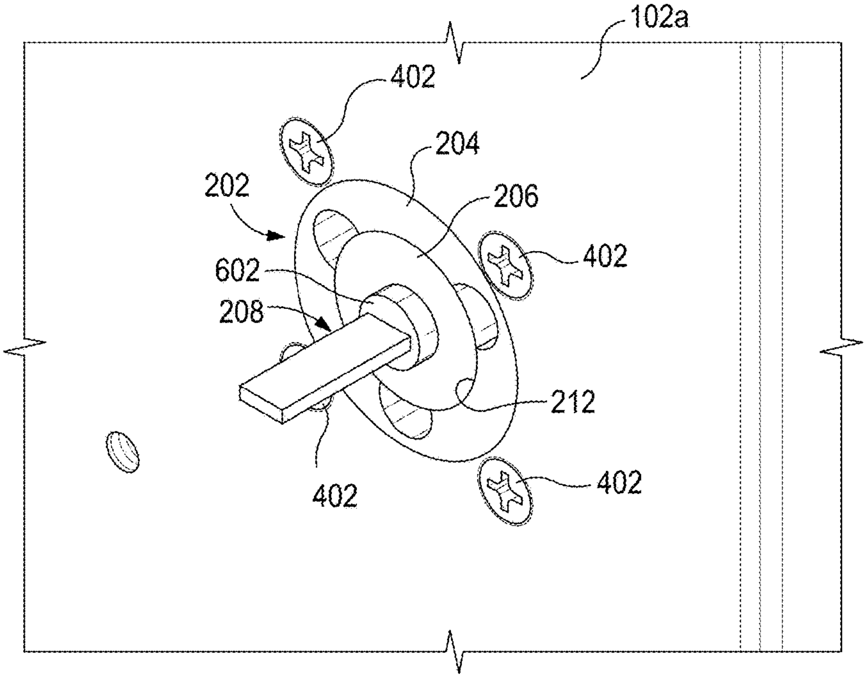
FIGS. 7A and 7B are isometric and front views, respectively, of the cylinder dry lock assembly of FIG. 2 fully assembled on the first stile, according to one or more embodiments.
Figure 7B:
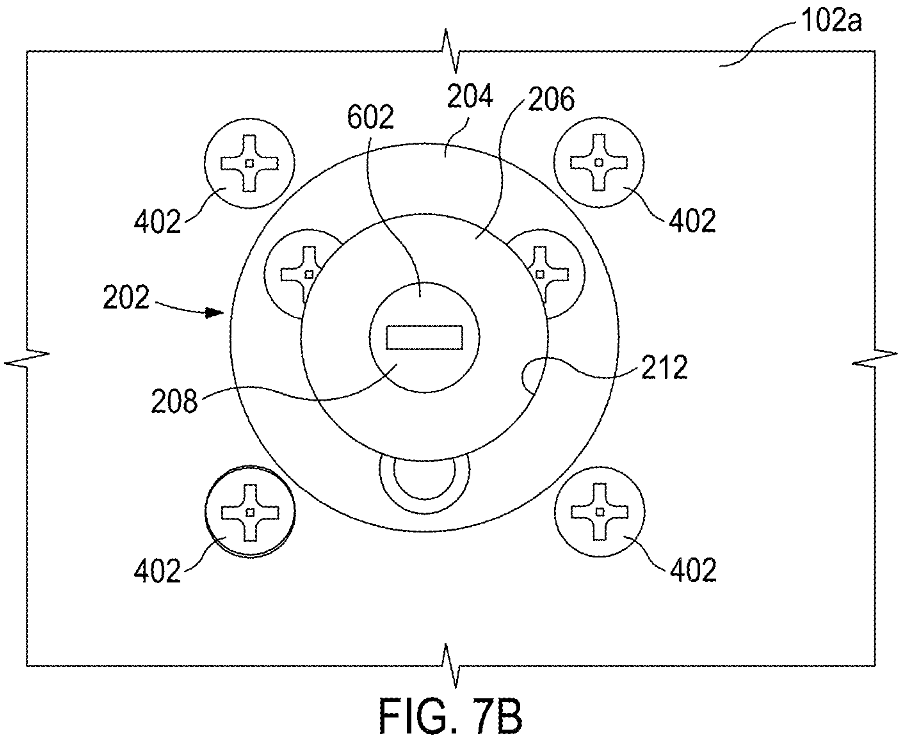

FIGS. 7A and 7B are isometric and front views, respectively, of the cylinder dry lock assembly 202 as fully assembled on the first stile 102*a*, according to one or more embodiments. More specifically, FIGS. 7A-7B show the main body 204 secured to the first stile 102*a* with the mechanical fasteners 402, as generally described above, and the low-friction member 206 and the actuation mechanism 208 are received within the central orifice 212, as also described above.

Prior to receiving the low-friction member 206 and the actuation mechanism 208 within the central orifice 212, a sealant may be applied at an interface between the shelf 404 (FIG. 4B) and the actuation mechanism 208. In some embodiments, for example, the sealant may be applied to the shelf 404. Alternatively, or in addition thereto, the sealant may be applied to portions of the actuation mechanism 208 (e.g., the head 602) and the low-friction member 206 prior to being advanced into the central orifice 212. The sealant may help generate a sealed interface between the low-friction member 206, the actuation mechanism 208, and the main body 204 during operation. In at least one embodiment, the sealant may comprise a non-water soluble grease. In other embodiments, however, the sealant may comprise a gasket or other type of sealing device.

Figure 8:
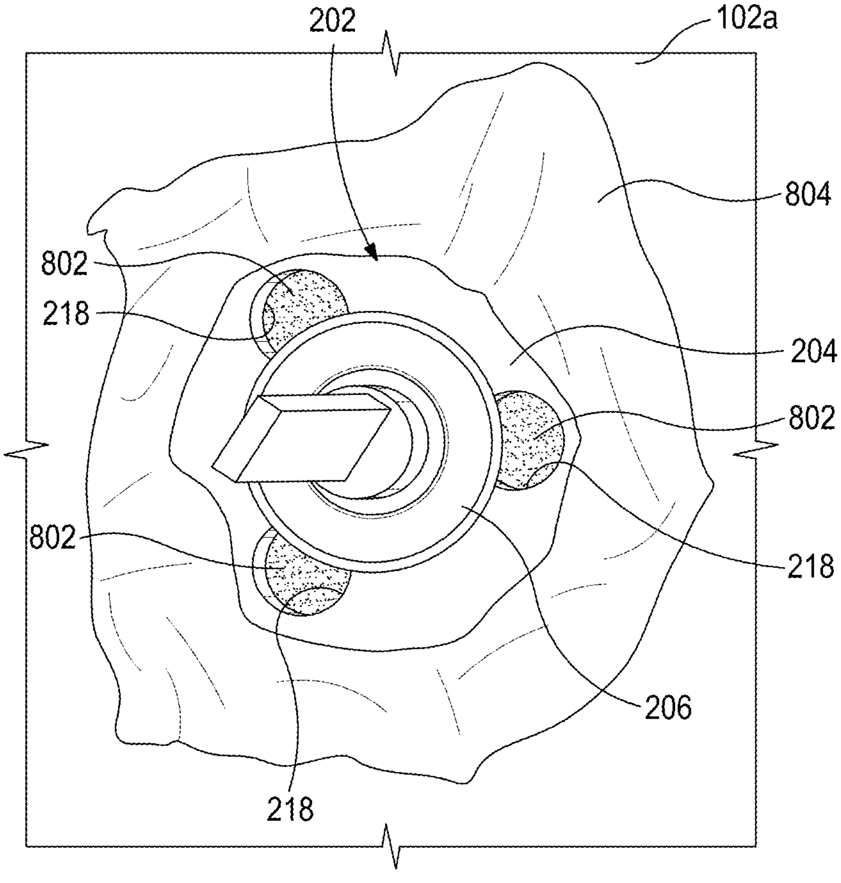
FIG. 8 is another isometric view of the cylinder dry lock assembly of FIG. 2 as fully assembled on the first stile, according to one or more additional embodiments.

FIG. 8 is another isometric view of the cylinder dry lock assembly 202 as fully assembled on the first stile 102*a*, according to one or more additional embodiments. In some embodiments, the mechanical fasteners 508 (FIG. 5C) used to secure the cylinder lock 502 (FIG. 5A) to the cylinder dry lock assembly 202 may be recessed into the reliefs 218 defined in the main body 204. In such embodiments, once the cylinder dry lock assembly 202 is secured to the first stile 102*a* using the mechanical fasteners 508 within the reliefs 218, a filler material 802 may be arranged (placed) in the reliefs 218. One purpose to the filler material 802 is to fill up (occupy) the space within the reliefs 218 between the mechanical fasteners 508 and the opening to the reliefs 218). In contrast, in reliefs 218 without mechanical fasteners 508, the filler material 802 may simply be received within such reliefs 218. In at least one embodiment, the filler material 802 may comprise a foam, but could alternatively comprise any type of filler material that occupies at least a portion of the reliefs 218.

In some embodiments, a sealant 804 may be applied over one or more of i) the fasteners 402 (FIGS. 4B and 7A), ii) the filler material 802, and iii) the periphery of the low-friction member 206. In embodiments where the low-friction member 206 comprises a sealed bearing, overlap of the sealant 804 onto the seal portion of the low-friction member 206 may occur without causing issues since the inner race of the low-friction member 206 is the rotating portion. The seal created by the sealant 804 limits or prevents water leakage, but still allows the cylinder lock 502 to operate as normal. In some embodiments, the sealant 804 may comprise a silicone material, but could alternatively comprise a non-water soluble grease.

Figure 9:
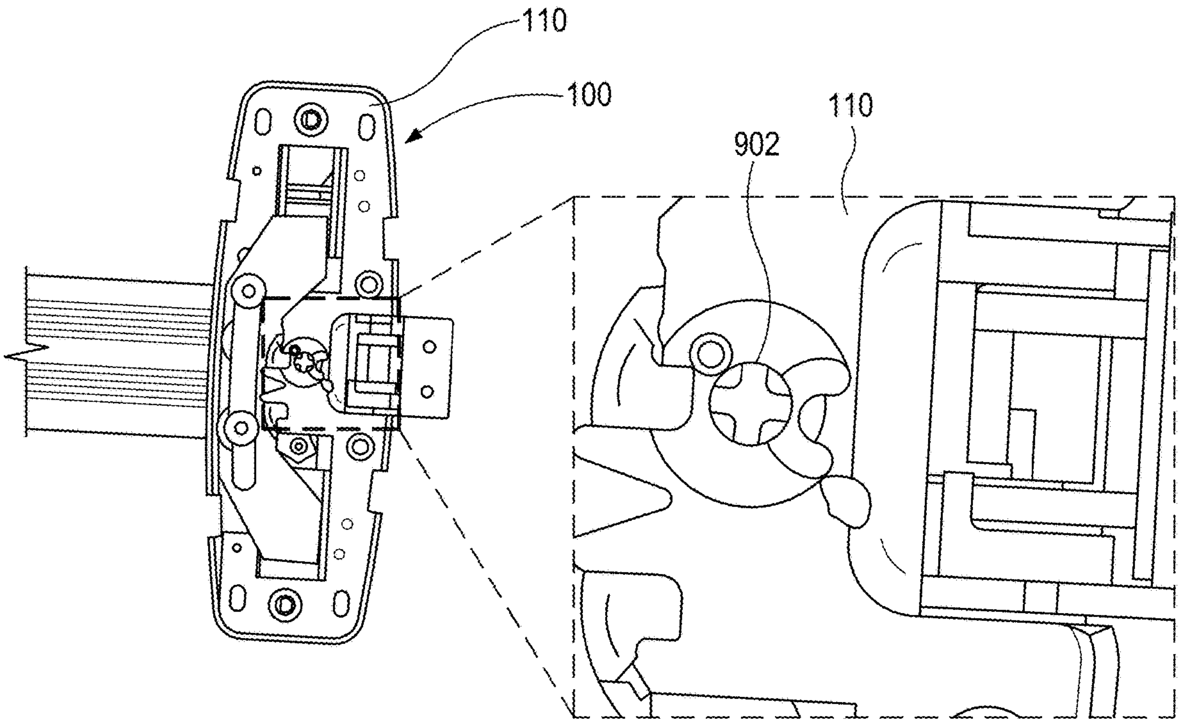
FIG. 9 depicts an enlarged portion of the interior of the latch housing of the exit device.

FIG. 9 depicts the back side of the latch housing 110 of FIG. 1 and an enlarged image (to the right) of a portion of the interior of the latch housing 110. As shown in the enlarged image, the latch housing 110 may provide a receiver 902 configured to receive the tab extension 604 (FIGS. 6A-6B) of the actuation mechanism 208 (FIGS. 2 and 6A-6B). The receiver 902 may provide access to the internal mechanical devices and gearing that causes the latch 114 (FIG. 1) to retract and extend. Accordingly, rotating the tab extension 604 while received within the receiver 902 will cause the latch 114 to retract or extend.

The embodiments discussed above are described in conjunction with a tab-activated cylinder lock; e.g., the cylinder lock 502 (FIGS. 5A-5C) actuatable with the tab 506 (FIG. 5B) received into the recess 606 (FIG. 6B) of the actuation mechanism 208 (FIGS. 2, 6A-6B, and 7A-7B), and the actuation mechanism 208 being received into the receiver 902 (FIG. 9) of the latch housing 110 (FIG. 9). The principles of the present disclosure, however, are not limited to tab-activated cylinder locks. Rather, as discussed below, it is contemplated herein to replace the tab activated cylinder lock with a cam-activated cylinder lock, which may be used in a similar manner.

FIGS. 10A-10F depict features and assembly of another example cylinder dry lock assembly 1000 that may be used in conjunction with the door 101 of FIG. 1, according to the principles of the present disclosure. The cylinder dry lock assembly 1000 may be similar in some respects to the cylinder dry lock assembly 202 described above and, therefore, may be best understood with reference thereto, where like numerals represent like components not described again in detail. In contrast to the cylinder dry lock assembly 202, the cylinder dry lock assembly 1000 may be configured to operate in conjunction with a cam-activated cylinder lock, which may be configured to operate with a thumb-turn mounted lock located on the interior of a door. However, the cam-activated cylinder lock may alternatively be designed to operate in in conjunction with other types of door hardware, without departing from the scope of the disclosure.

Figures 10A, 10B:
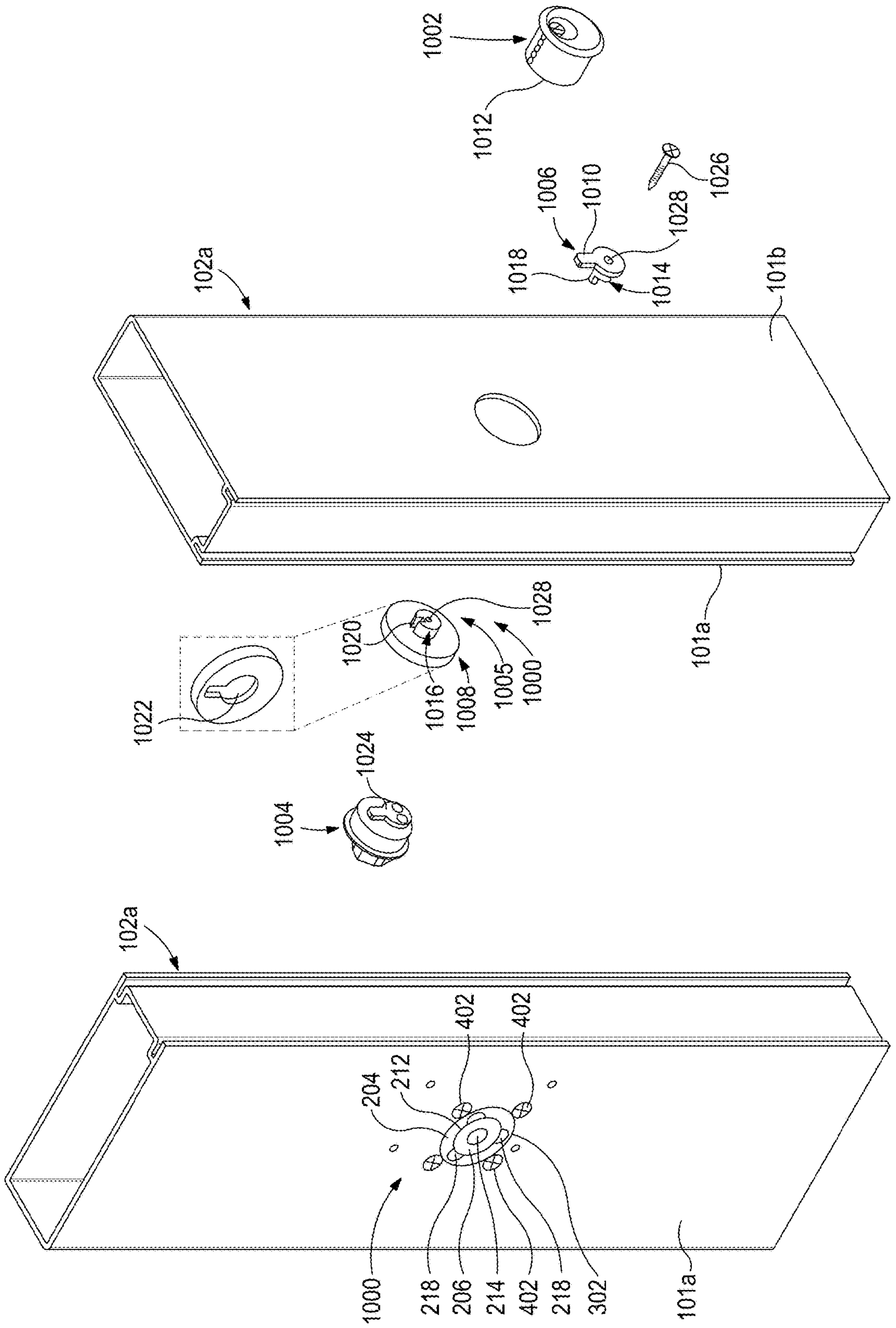
FIG. 10A is an isometric view of a portion of another example cylinder dry lock assembly, according to one or more additional embodiments.
FIG. 10B is an exploded view of the cylinder dry lock assembly of FIG. 10A.

FIG. 10A is an isometric view of a portion of the cylinder dry lock assembly 1000 as secured to the first stile 102*a*. Similar to the cylinder dry lock assembly 202 described above, the cylinder dry lock assembly 1000 includes the main body 204 and the low-friction member 206, and the main body 204 defines the central orifice 212 sized to receive the low-friction member 206. The main body 204 may be secured to the first stile 102*a* at the hole 302 defined in the interior surface 101*a* of the stile 102*a* using the mechanical fasteners 402, as generally described above.

In the illustrated embodiment, the low-friction member 206 defines the inner hole 214 sized to receive or mate with an actuation mechanism (not shown) via an interference fit or the like. When the actuation mechanism is properly mated with the low friction-member 206, the actuation mechanism will be able to rotate relative to the main body 204. In some embodiments, however, the low-friction member 206 and the actuation mechanism may comprise a monolithic, single component part (e.g., 3D printed) and may be sized to be jointly received within the central orifice 212. In such embodiments, both the actuation mechanism and the low-friction member 206 may be designed to rotate simultaneously relative to the main body 204.

In some embodiments, the main body 204 may further provide or otherwise define the reliefs 218, as generally described above. At least one of the reliefs 218 may provide a means for introducing a mechanical fastener (not shown) used to attach a cam-actuated cylinder lock (not shown) to the main body 204, and thereby attach the cylinder lock to the first stile 102*a* when the cylinder dry lock assembly 1000 is properly installed in the first stile 102*a*. Moreover, at least one of the reliefs 218 may be used as an access point where a bearing puller (or the like) may be introduced to remove the low-friction member 206 and the actuation mechanism if replacement or maintenance is required.

FIG. 10B is an exploded view of the cylinder dry lock assembly 1000, according to one or more embodiments. FIG. 10B also depicts a cam-activated cylinder lock 1002 and a thumb-turn lock 1004 operable with the cylinder dry lock assembly 1000. The cylinder lock 1002 may be configured to be mounted to the exterior surface 101*b* of the stile 102*a*, and the thumb-turn lock 1004 may be configured to be mounted to the interior surface 101*a* of the stile 102*a*.

The cylinder dry lock assembly 1000 includes an actuation mechanism 1005 configured to extend between the cylinder lock 1002 and the thumb-turn lock 1004 as assembled on the stile 102*a*. Once properly assembled, actuation of the cylinder lock 1002 will correspondingly actuate (rotate) the thumb-turn lock 1004 via the interposing actuation mechanism 1005, and vice versa.

In the illustrated embodiment, the actuation mechanism 1005 comprises multiple component parts, specifically, a first or "male" cam adapter 1006 and a second or "female" cam adapter 1008. The position or assembly of the male and female cam adapters 102, 104 may be switched, without departing from the scope of the disclosure. The male cam adapter 1006 may be matable with the cylinder lock 1002 and the female cam adapter 1008 may be matable with the thumb-turn lock 1004. More specifically, the male cam adapter 1006 may provide or define a cam mating feature 1010 matable with a corresponding cam mating feature 1012 (partially shown) provided or defined by the cylinder lock 1002. When the cam mating features 1010, 1012 are properly mated, actuation of the cylinder lock 1002 will correspondingly actuate (rotate) the male cam adapter 1006.

The male cam adapter 1006 may also be operatively coupled to or otherwise matable with the female cam adapter 1008 such that actuation (rotation) of the male cam adapter 1006 will correspondingly actuate (rotate) the female cam adapter 1008, and vice versa. In some embodiments, for example, the male cam adapter 1006 may provide or otherwise define a first indexing feature 1014 and the female cam adapter 1008 may define a second indexing feature 1016 matable with the first indexing feature 1014. In the illustrated embodiment, the first and second indexing features 1014, 1016 are depicted as projections that extend from the male and female cam adapters 1006, 1008, respectively. The projections may cooperatively extend through the inner hole 214 (FIG. 10A) defined in the low friction member 206 (FIG. 10A) and mate at an intermediate location.

The first and second indexing features 1014, 1016 may be matable, such that rotation of the male cam adapter 1006 will correspondingly rotate the female cam adapter 1008 in the same direction, and vice versa. More specifically, an as shown in the illustrated embodiment, the first indexing feature 1014 may comprise or otherwise define an extension 1018, and the second indexing feature 1016 may comprise or otherwise define a channel or groove 1020 matable with and configured to receive the extension 1018. Mating the extension 1018 with the groove 1020 will transmit rotation of the male cam adapter 1006 to the female cam adapter 1008, and vice versa. In other embodiments, however, the extension 1018 may be provided on the second indexing feature 1016 and the groove 1020 may alternatively be provided on the first indexing feature 1014.

The features of the first and second indexing features 1014, 1016 shown in FIG. 10B are only one means of matingly engaging the male and female cam adapters 1006, 1008. Those skilled in the art will readily appreciate that the first and second indexing features 1014, 1016 may assume a variety of different designs and configurations capable of matingly engaging the male and female cam adapters 1006, 1008, without departing from the scope of the disclosure.

The female cam adapter 1008 may be matable with the thumb-turn lock 1004. More specifically, and as shown in the inset graphic of FIG. 10B, the backside of the female cam adapter 1008 provides or defines a cam mating feature 1022 matable with a corresponding cam mating feature 1024 provided on the thumb-turn lock 1004. Once the cam mating features 1022, 1024 are properly mated, rotation of the female cam adapter 1008 will correspondingly actuate the thumb-turn lock 1004, and vice versa. In the illustrated embodiment, the cam mating feature 1022 comprises a recess or pocket defined in the backside of the female cam adapter 1008, and the cam mating feature 1024 comprises a projection extending from the backside of the thumb turn lock 1004 and sized to be received within the cam mating feature 1024. In other embodiments, however, the configurations of the cam mating features 1022, 1024 may be reversed, without departing from the scope of the disclosure.

In the illustrated embodiment, the actuation mechanism 1005 includes male and female cam adapters 1006, 1008 that can be operatively coupled, such as being mechanically fastened together. For example, in some embodiments, a mechanical fastener 1026 may be extended through coaxially aligned holes 1028 defined in both adapters 1006, 1008. In other embodiments, however, the actuation mechanism 1005 may comprise a monolithic, or single part. In such embodiments the male and female cam adapters 1006, 1008 may form a single, integral piece of the cylinder dry lock assembly 1000. In yet other embodiments, the actuation mechanism 1005 and the low friction member 206 may comprise a single, integral piece of the cylinder dry lock assembly 1000, without departing from the scope of the disclosure.

Figure 10D:
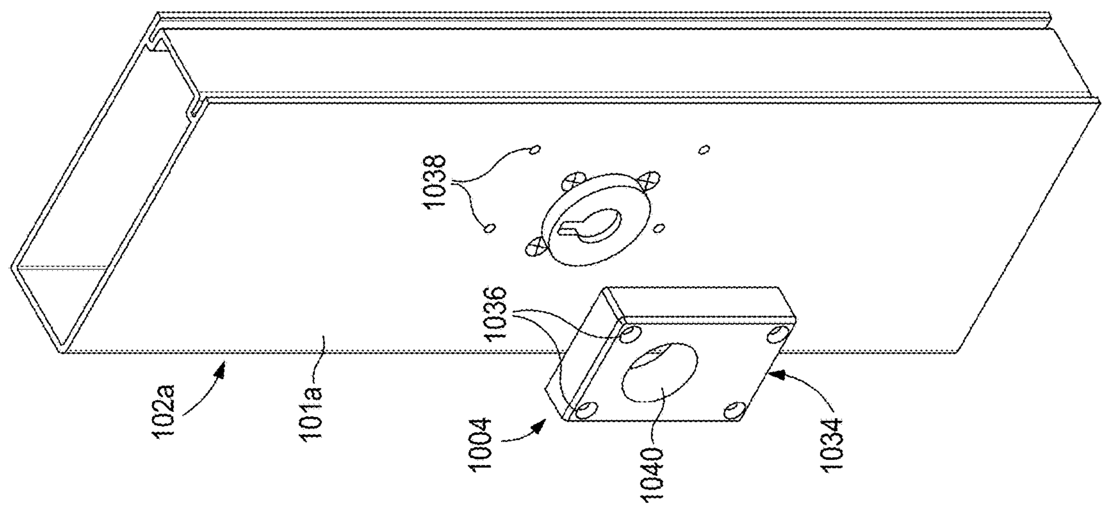
FIGS. 10D-10F show example assembly steps for an example thumb-turn lock, according to one or more embodiments.
Figure 10C:
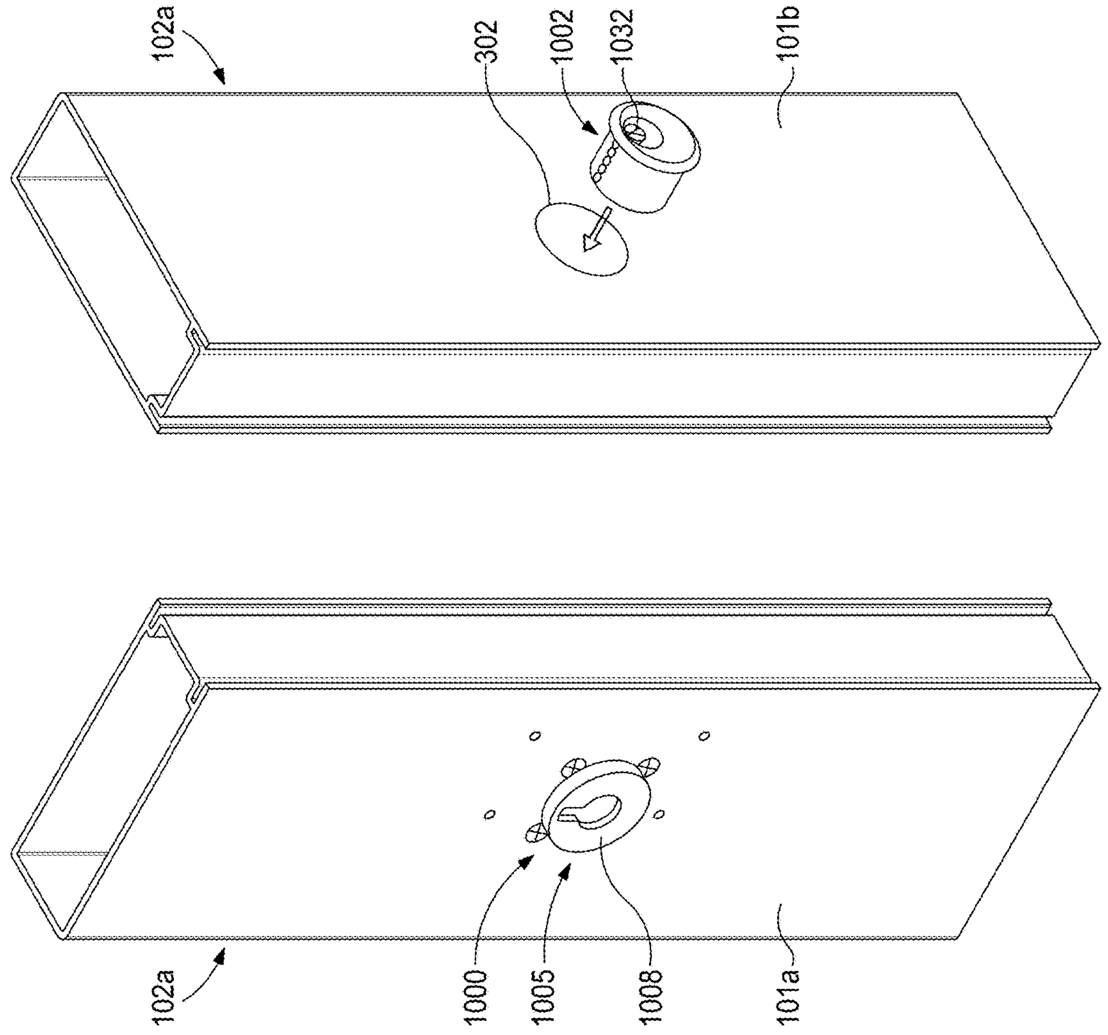
FIG. 10C shows and demonstrates example assembly of the cylinder dry lock assembly of FIG. 10A and an example cam-activated cylinder lock, according to one or more embodiments.

FIG. 10C shows and demonstrates example assembly of the cylinder dry lock assembly 1000 and the cylinder lock 1002. The image on the left shows the cylinder dry lock assembly 1000 installed on the interior surface 101*a* of the stile 102*a*. More specifically, the backside of the actuation mechanism 1005 (the female cam adapter 1008) is shown. The image on the right shows the cylinder lock 1002 being advanced into the hole 302 defined in the stile 102*a* and extending between the interior and exterior surfaces 101*a,b* for assembly. Advancing the cylinder lock 1002 into the hole 302 will mate the cylinder lock 1002 with the actuation mechanism 1005, and more specifically, with the male cam adapter 1006 (FIG. 10B), as described above. As illustrated, the cylinder lock 1002 provides a key hole 1032 configured to receive a key (not shown), and rotating the key while inserted into the key hole 1032 actuates the cylinder lock 1002, which causes corresponding rotation of the actuation mechanism 1005, including the female cam adapter 1008.

Figure 10F:
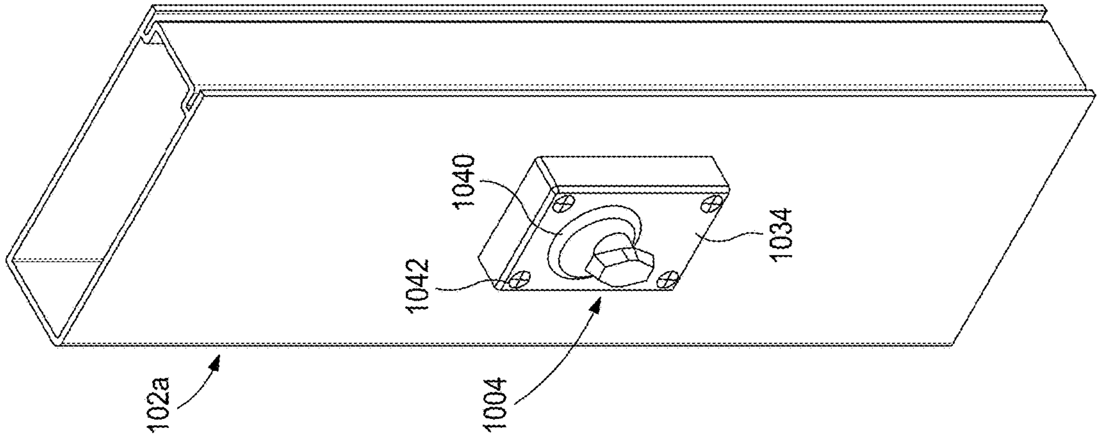
Figure 10E:
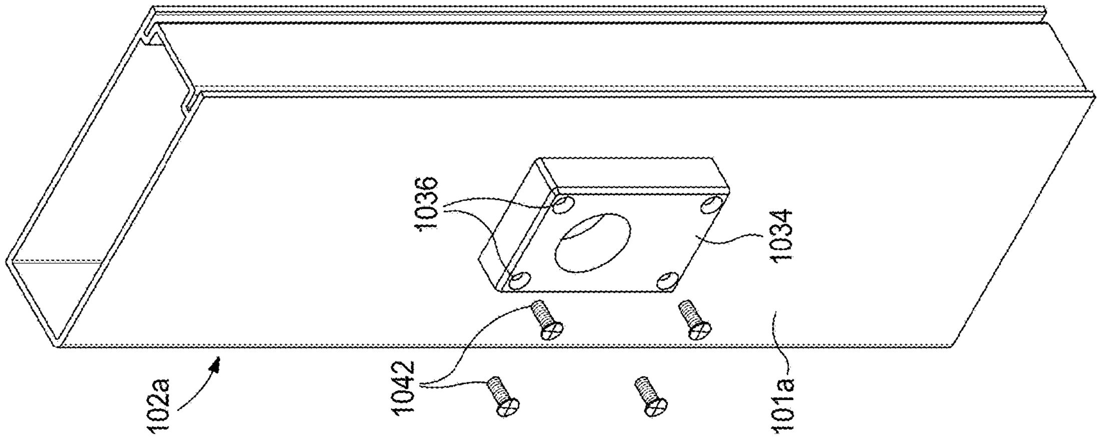

FIGS. 10D-10F show example assembly steps for the thumb-turn lock 1004 on the interior surface 101*a* of the stile 102*a*, according to one or more embodiments. In FIG. 10D, the thumb-turn lock 1004 includes an install cover 1034, which may be used to cover the actuation mechanism 1005, and more specifically, the female cam adapter 1008. In the illustrated embodiment, the install cover 1034 includes one or more apertures 1036 alignable with a corresponding one or more holes 1038 defined in the stile 102*a*. The install cover 1034 also defines a central orifice 1040 sized to receive the main actuation mechanism of the thumb-turn lock 1004.

In FIG. 10E, the install cover 1034 is seated against the interior surface 101*a* of the stile 102*a*, and one or more mechanical fasteners 1042 may be extended into the apertures 1036 co-axially aligned with the holes 1038 (FIG. 10D). Tightening the mechanical fasteners 1042 will secure the install cover 1034 to the interior surface 101*a* of the stile 102*a*.

In FIG. 10F, the install cover 1034 is secured to the stile 102*a* using the mechanical fasteners 1042, and the main actuation mechanism of the thumb-turn lock 1004 is installed through the central orifice 1040 of the install cover 1034, thus completing the installation of the thumb-turn lock 1004. Once properly installed, rotation of the thumb-turn lock 1004 in either angular direction will correspondingly cause the actuation mechanism 1005 (FIG. 10C) to rotate (actuate), and thereby cause actuation of the cylinder lock 1002 (FIG. 10C) via its mating interconnection. Similarly, actuation (operation) of the cylinder lock 1002 will correspondingly cause the actuation mechanism 1005 to rotate (actuate), and thereby cause actuation of the thumb-turn lock 1004.

The cylinder dry lock 1000 thus creates an interface between the cylinder lock 1002 and the thumb-turn lock 1004 that greatly reduces the amount of water that might flow freely through the interface in the event of a flood. Moreover, the cylinder dry lock 1000 may also help facilitate an airtight door assembly. During non-flood conditions, the cylinder dry lock 1000 also allows normal locking and unlocking of the door 101 (FIG. 1).

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The use of directional terms such as above, below, upper, lower, upward, downward, left, right, and the like are used in relation to the illustrative embodiments as they are depicted in the figures, the upward direction being toward the top of the corresponding figure and the downward direction being toward the bottom of the corresponding figure.

What is claimed is:

1. A door assembly, comprising:
- a door; and
- a cylinder dry lock assembly mounted to the door and including a cylinder lock, a thumb-turn lock, and an actuation mechanism interposing the cylinder lock and the thumb-turn lock, the actuation mechanism including:
  - a first adapter matable with the cylinder lock; and
  - a second adapter matable with the thumb-turn lock and the first adapter,
- wherein actuation of the cylinder lock actuates the thumb-turn lock via the actuation mechanism,
- wherein the first adapter provides an extension and the second adapter provides a groove to receive the extension,
- wherein the cylinder dry lock assembly further includes:
  - a main body that defines a central orifice; and
  - a low-friction member received within the central orifice and defining an inner hole, the extension of the first adapter extending within the inner hole, and
- wherein the cylinder dry lock assembly generates a sealed interface that prevents water from migrating into the door.

2. The door assembly of claim 1, wherein the first adapter defines a projection and the cylinder lock defines a feature to receive the projection.

3. The door assembly of claim 1, wherein the thumb-turn lock defines a projection and then second adapter defines a recess to receive the projection.

4. The door assembly of claim 1, wherein the first adapter defines a first hole and the second adapter defines a second hole, and wherein the first and second holes are co-axially aligned to receive a fastener to couple the first and second adapters.

5. The door assembly of claim 1, wherein the door defines:
- a first hole in a first surface of the door to receive the cylinder lock; and a second hole in a second surface of the door to receive the second adapter.

6. A cylinder dry lock assembly, comprising:

a cylinder lock providing a keyhole to receive a key;

a thumb-turn lock; and an actuation mechanism positionable between the cylinder lock and the thumb-turn lock, the actuation mechanism including:

a first adapter matable with the cylinder lock; and a second adapter matable with the thumb-turn lock and the first adapter and, wherein actuation of the cylinder lock with the key actuates the thumb-turn lock via the actuation mechanism, wherein the first adapter provides an extension and the second adapter provides a groove to receive the extension, and wherein the cylinder dry lock assembly further comprises:

a main body that defines a central orifice; and a low-friction member received within the central orifice and defining an inner hole, wherein the extension extends within the inner hole.

7. The cylinder dry lock assembly of claim 6, wherein the first adapter defines a projection and the cylinder lock defines a feature to receive the projection.

8. The cylinder dry lock assembly of claim 6, wherein the thumb-turn lock defines a projection and then second adapter defines a recess to receive the projection.

9. The cylinder dry lock assembly of claim 6, wherein the first adapter defines a first hole and the second adapter defines a second hole, and wherein the first and second holes are co-axially alignable to receive a fastener to couple the first and second adapters.

10. The cylinder dry lock assembly of claim 6, wherein:

the cylinder lock is sized to be received with a first hole of a first surface of a door; and the second adapter is sized to be received with a second hole of a second surface of the door.

11. A method, comprising:

inserting a main body and a low-friction member within an interior of a door, wherein the main body defines a central orifice to receive the low-friction member and the low-friction member defines an inner hole;

inserting a first adapter of an actuation mechanism into an interior of the door through a first hole defined in a first surface of the door;

inserting a second adapter of the actuation mechanism into the interior of the door through a second hole defined in a second surface of the door;

inserting a first projection of the first adapter within the inner hole;

inserting a second projection of the second adapter within the inner hole;

mating the first and second projections at a location within the inner hole;

mating a cylinder lock with the first adapter; and coupling a thumb-turn lock to the second adapter.

12. The method of claim 11, wherein mating the cylinder lock with the first adapter comprises receiving a projection of the first adapter within a feature of the cylinder lock.

13. The method of claim 11, wherein coupling the thumb-turn lock to the second adapter comprises receiving a projection of the thumb-turn lock within a recess defined by the second adapter.

14. The method of claim 11, further comprising:

co-axially aligning a first hole of the first adapter with a second hole of the second adapter; and inserting a fastener through the first and second holes to couple the first and second adapters.

15. The method of claim 11, wherein mating the cylinder lock with the first adapter comprises wherein mating the cylinder lock with the first adapter such that actuation of the cylinder lock actuates the thumb-turn lock via the actuation mechanism.

16. The method of claim 11, further comprising:

coupling an install cover to the first surface of the door; and inserting the thumb-turn lock through a central orifice of the install cover to couple the thumb-turn lock to the second adapter.

* * * * *